United States Patent [19]

Norling et al.

[11] Patent Number: 5,377,545
[45] Date of Patent: Jan. 3, 1995

[54] SERVO ACCELEROMETER WITH TUNNEL CURRENT SENSOR AND COMPLEMENTARY ELECTROSTATIC DRIVE

[75] Inventors: Brian L. Norling, Mill Creek; James R. Woodruff, Redmond, both of Wash.

[73] Assignee: AlliedSignal Inc., Morris Township, Morris County, N.J.

[21] Appl. No.: 986,958

[22] Filed: Dec. 8, 1992

[51] Int. Cl.$^6$ ............................................. G01P 15/08
[52] U.S. Cl. ..................................... 73/517 B; 73/1 D
[58] Field of Search .......... 73/517 B, 517 R, 577 AV, 73/575, 1 D

[56] References Cited

U.S. PATENT DOCUMENTS

| | | | |
|---|---|---|---|
| 4,472,239 | 9/1984 | Johnson et al. | 437/7 |
| 4,507,170 | 3/1985 | Myhre | 156/633 |
| 4,614,119 | 9/1986 | Zavracky et al. | 73/704 |
| 4,638,669 | 1/1987 | Chou | 73/517 R |
| 4,711,128 | 12/1987 | Boura | 73/517 B |
| 4,783,237 | 11/1988 | Aine et al. | 437/15 |
| 4,841,773 | 6/1989 | Stewart | 73/505 |
| 4,882,933 | 11/1989 | Petersen et al. | 73/517 R |
| 4,891,984 | 1/1990 | Fujii et al. | 73/517 R |
| 4,901,586 | 2/1990 | Blake et al. | 73/517 AV |
| 4,928,203 | 5/1990 | Swindal et al. | 73/517 AV |
| 4,996,877 | 3/1991 | Stewart et al. | 73/505 |
| 5,009,111 | 4/1991 | West et al. | 73/517 B |
| 5,048,339 | 9/1991 | Neuhaus | 73/1 D |
| 5,079,958 | 1/1992 | Takase et al. | 73/862.64 |
| 5,211,051 | 5/1993 | Kaiser et al. | 73/1 D |
| 5,265,470 | 11/1993 | Kaiser et al. | 73/178 R |

OTHER PUBLICATIONS

T. W. Kenny, et. al., "Electron Tunnel Sensor Technology", Pasadena, Calif., 1990, pp. 77–92.
T. W. Kenny, et. al., "A Micromachined Silicon Electron Tunneling Sensor", Napa Valley, Calif., 1990, pp. 192–196.
W. J. Kaiser, et. al., "Tunnel-Effect Displacement Sensor", Pasadena, Calif., 1989, pp. i and 1–2.
S. B. Waltman, et. al., "An Electron Tunneling Sensor", Pasadena, Calif., 1989, pp. 1a–9a.
A. P. Pisano, "Resonant-Structure Micromotors", Berkeley, Calif., 1989, pp. 44–48.
W. C. Tang, et. al., "Laterally Driven Polysilicon Resonant Microstructures", Berkeley, Calif., 1989, pp. 53–59.

*Primary Examiner*—Hezron E. Williams
*Assistant Examiner*—Helen C. Kwok
*Attorney, Agent, or Firm*—Howard G. Massung

[57] ABSTRACT

A servo accelerometer uses a tunnel current sensor having a first sensing electrode coupled in fixed alignment with a frame and a second sensing electrode coupled to a proof mass. A position sensing circuit develops a sensing signal indicative of displacement of the proof mass. A feedback circuit provides an output signal and provides a feedback signal to electrostatic drive electrodes for applying an electrostatic repositioning force to the proof mass. The proof mass and frame are connected by a highly compliant suspension structure.

45 Claims, 7 Drawing Sheets

SERVO ACCELEROMETER WITH TUNNEL CURRENT SENSOR AND COMPLEMENTARY ELECTROSTATIC DRIVE

FIELD OF THE INVENTION

The present invention relates to micromachined devices used for measuring acceleration. More particularly, the present invention is directed to a servo accelerometer utilizing a tunnel current sensor for sensing the position of a proof mass and a complementary electrostatic drive for repositioning the proof mass in response to the acceleration of a vehicle.

BACKGROUND OF THE INVENTION

The Kenny et al article entitled "Electron Tunnel Sensor Technology", presented at the first national conference and exhibition of NASA's technology for transfer in November of 1990, describes a micromachined servo accelerometer that utilizes a tunnel current sensor. The accelerometer is micromachined from silicon and includes a cantilever spring with an integral tip. A gold film is deposited over the tip to form a tunnel current electrode. A gold film is also deposited over the cantilever spring to form an electrostatic drive electrode. The inner rectangular area of the folded cantilever spring, here referred to as a proof mass, can be deflected relative to the outer segments, here referred to as a frame, by application of an electric potential between the drive electrode and a corresponding drive electrode disposed on another component of the accelerometer.

Once assembled, a bias voltage is applied to the electrostatic drive electrodes to close the electrodes and drive the proof mass to a servo null position at which a tunnel current having a predetermined value is established. Active regulation of the tip-electrode separation is carried out using feedback control.

Operation of the device as an accelerometer may be achieved in either of two ways. In the first approach, denoted as open loop, acceleration is measured at frequencies above the feedback loop bandwidth in accordance with a predetermined mathematical relationship. In the second approach, denoted as closed loop, acceleration is measured for all frequencies less than the feedback loop bandwidth. In this case, an acceleration displaces the proof mass. The displacement results in a corresponding change in the tunnel current from its predetermined value. A feedback loop responds to the change in the tunnel current by adjusting the voltage potential between the drive electrodes so as to return the proof mass to its servo null position. The variation in the voltage from its bias value is used to calculate the acceleration value since the acceleration value is a function of the voltage variation.

The drive electrodes of the accelerometer can only apply an attractive force which draws the electrodes toward one another. As a result the electrostatic drive can provide the required servo rebalance force only when the acceleration is in a direction which drives the electrodes apart from one another. When an acceleration is applied in the opposite direction in which the electrodes are driven toward one another, the voltage difference between the electrodes is decreased thereby decreasing the drive force. The flexures which connect the proof mass to the frame then provide an elastic force to return the proof mass to its servo null position. Without acceleration, the elastic force provided by the flexures must at least be equal to the rebalance force required to reposition the proof mass to its servo null position upon application of full scale acceleration. Likewise, the electrostatic drive must be capable of providing enough force to drive the proof mass to its servo null position upon application of full scale acceleration. To provide the necessary dynamic response, the forces which the electrostatic drive and the flexures are respectively capable of providing must exceed the minimum force required to reposition the proof mass to its servo null position upon application of full scale acceleration.

The accelerometer of the Kenny et al article is deficient in several respects. Both the stiffness of the flexures and the position at which the flexures hold the proof mass when no forces are applied (i.e., the mechanical null position) can change with aging, temperature, and other environmental effects. Such changes produce a corresponding change in the drive force required to keep the proof mass at its servo null position and thus effect the bias voltage applied to the drive electrodes. Also, changes in the values of the components of the electrical circuitry of the feedback loop can cause a change in the servo null position to a position where the elastic force from the flexures is different from the elastic forces of the original servo null position. This alters the drive force required to hold the proof mass so that the drive force at the new null position is different from the drive force required at the original null position. Since the drive voltage is used to calculate the acceleration value, such changes cause a change in the acceleration signal bias.

A further deficiency of the Kenny et al accelerometer is that the force on the electrostatic drive electrodes is approximately proportional to the square of the charge on the drive electrodes. There is thus a non-linear relationship between the acceleration value and the drive voltage variations used to measure the acceleration.

SUMMARY OF THE INVENTION

The present invention is directed to a silicon micromechanical servo accelerometer which employs a tunnel current sensor to sense the displacement of the proof mass when the proof mass is subject to an acceleration and which uses a complementary electrostatic drive that is capable of producing forces in two opposing directions to maintain the proof mass in its servo null position. More specifically, the current output of the tunnel current sensor is used to provide a signal indicative of the position of the proof mass to a complementary electrostatic drive which maintains the proof mass at a servo null position. The signal provided to the electrostatic drive is used as an output signal that is a function of the sensed acceleration.

The servo accelerometer of the present invention includes a proof mass coupled to a support frame by an elastic suspension system. A tunnel current position sensor is utilized to detect the relative position of the frame and proof mass and includes a first tunnel current electrode coupled in a fixed relationship with the frame and a second tunnel current electrode coupled to the proof mass. Variations in the tunnel current flowing between the first and second tunnel current electrodes are used to sense the displacement of the proof mass which occurs when the proof mass is subject to an acceleration input. More specifically, a position sensing circuit including the tunnel current electrodes generates a position sensing signal indicative of displacement of the proof mass relative to the frame. This position sensing signal is supplied to a drive circuit which provides drive signals to two pair of electrostatic drives. The electrostatic drives are arranged to apply complementary forces to the proof mass to reposition the proof mass to its electrical null position. The drive signals are linearly related to sensed acceleration and are used as the output signal of the servo accelerometer.

The present invention overcomes many of the problems associated with other servo accelerometers that use a tunnel current position sensor for sensing the displacement of a proof mass. Use of a complementary electrostatic drive greatly reduces the effect of the elastic suspension forces on the acceleration signal bias. Since the requisite elastic suspension force is greatly reduced, the various components of the accelerometer may be arranged so that the electrical null and mechanical null positions substantially coincide. Furthermore, the complementary configuration allows the accelerometer to provide an output signal which is linearly related to the acceleration of the proof mass.

Another feature of the present invention is the provision for a proof mass suspension system which is highly compliant along a desired axis. The high compliance suspension allows motion of the proof mass along a desired sensitive axis while providing a relatively rigid constraint to all other degrees of freedom. In accordance with one embodiment, a pair of spaced flexures suspend the proof mass. In another embodiment, a singular torsion suspension is utilized. In still another embodiment, the proof mass is suspended with parallel beams spaced in the direction of desired motion of the proof mass. In another embodiment, a cross flexure arrangement constrains the proof mass to one degree of freedom.

BRIEF DESCRIPTION OF THE DRAWINGS

Other objects and features of the present invention may be further understood by reference to the following detailed description of the preferred embodiments of the invention taken in conjunction with the accompanying drawings, on which.

It will be understood that the drawings are not necessarily to scale. In certain instances, details which are not necessary for understanding various aspects of the present invention have been omitted for clarity.

DESCRIPTION OF THE PREFERRED EMBODIMENTS

Figure 1:
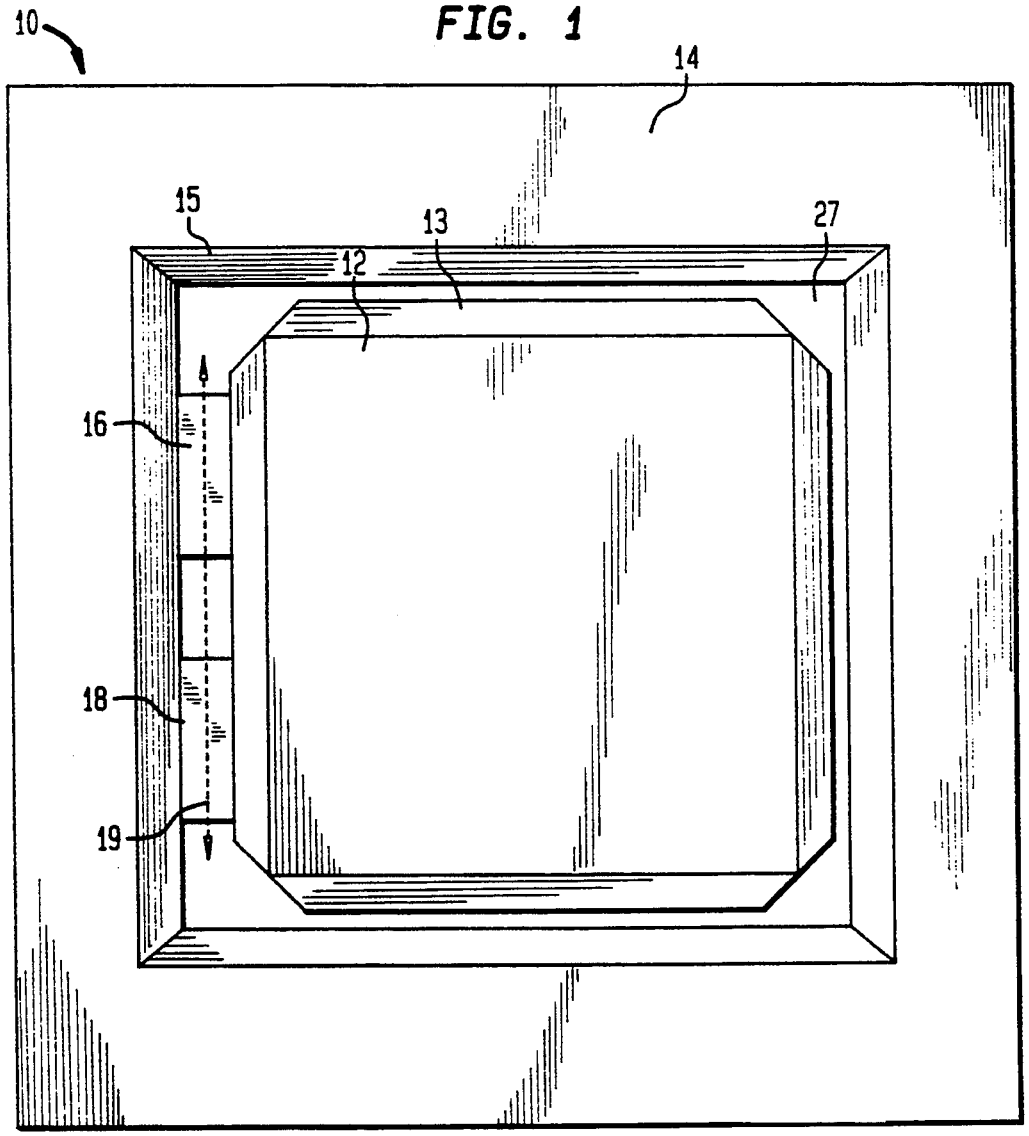
FIG. 1 is a plan view of a servo accelerometer in accordance with one embodiment of the invention.

FIG. 1 is a plan view illustrating a servo accelerometer 15 with portions removed for clarity. The servo accelerometer 15 includes a proof mass 20 which is coupled to a support frame 25 with first and second longitudinally extending flexures 30 and 35. The flexures provide a compliant suspension for the proof mass 20 for permitting rotation about a transversely extending hinge axis 40. The hinge axis 40 may be positioned, for example, midway between the proof mass 20 and support frame 25.

Figure 2:
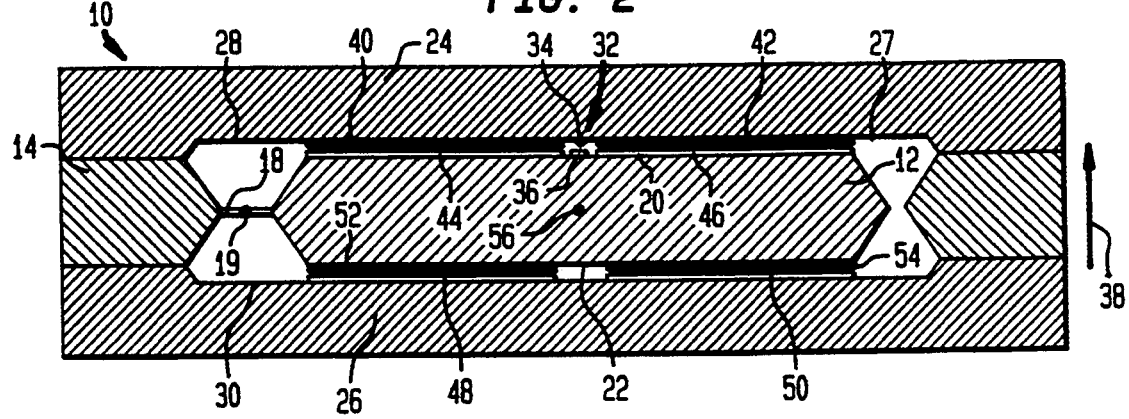
FIG. 2 is a cross sectional view of the servo accelerometer shown in FIG. 1.

As best seen in FIG. 2, the proof mass 20 includes a pair of opposed face portions 45 and 50. The support frame 25 is bonded to upper and lower cover plates 55 and 60 to form a chamber 65. The upper cover plate 55 includes a surface 70 which is closely spaced from the face portion 45. Similarly, the lower cover plate 60 includes a surface 75 closely spaced from the face portion 50.

FIG. 2 also shows a tunnel current sensor 80. The tunnel current sensor 80 includes a first sensing electrode 85 which is mounted to the upper cover plate surface 70 and is thus in fixed alignment with the frame 25. A second sensing electrode 90 is mounted to the face portion 45 of the proof mass 20 and is maintained at a predetermined nominal spacing from the first sensing electrode 85.

The tunnel current sensor operates when a potential is applied across the first and second sensing electrodes 85 and 90 and they are drawn sufficiently close to each other to allow a tunnel current to flow therebetween. The resulting tunnel current is extremely sensitive to the separation of the first and second sensing electrodes 85 and 90. Accordingly, any movement of the proof mass about the hinge axis 45 in the direction denoted by line 95 results in a corresponding change in the magnitude of the tunnelling current.

FIG. 2 also shows the multiple drive electrodes of a complementary electrostatic drive arrangement used to initially position and subsequently maintain the proof mass 20 in its servo null position. The complementary electrostatic drive arrangement includes two pair of drive electrodes. The first pair of drive electrodes includes a first drive electrode 100 that is attached to surface 70 of the upper cover plate 55 and a second drive electrode 105 that is attached to the face portion 45 and is closely spaced from the first drive electrode 100. Likewise, the second pair of drive electrodes includes a third drive electrode 115 that is located on the lower cover plate surface 75 and a fourth electrode 110 that is located on the face portion 50 and disposed in close relation to the third drive electrode 115. The drive electrodes are all substantially the same size and shape. In a preferred embodiment, the drive electrodes are fabricated of gold and separated from the respective cover plates 55 and 60 and proof mass 20 with a layer of silicon oxide.

In a preferred realization, the upper and lower cover plates 55 and 60 are sealingly engaged with the frame 25 and a damping gas is disposed in the chamber 65 to provide gas damping of the proof mass. The type of gas and the spacing between the proof mass and cover plates determine the damping characteristics.

Figure 2A:
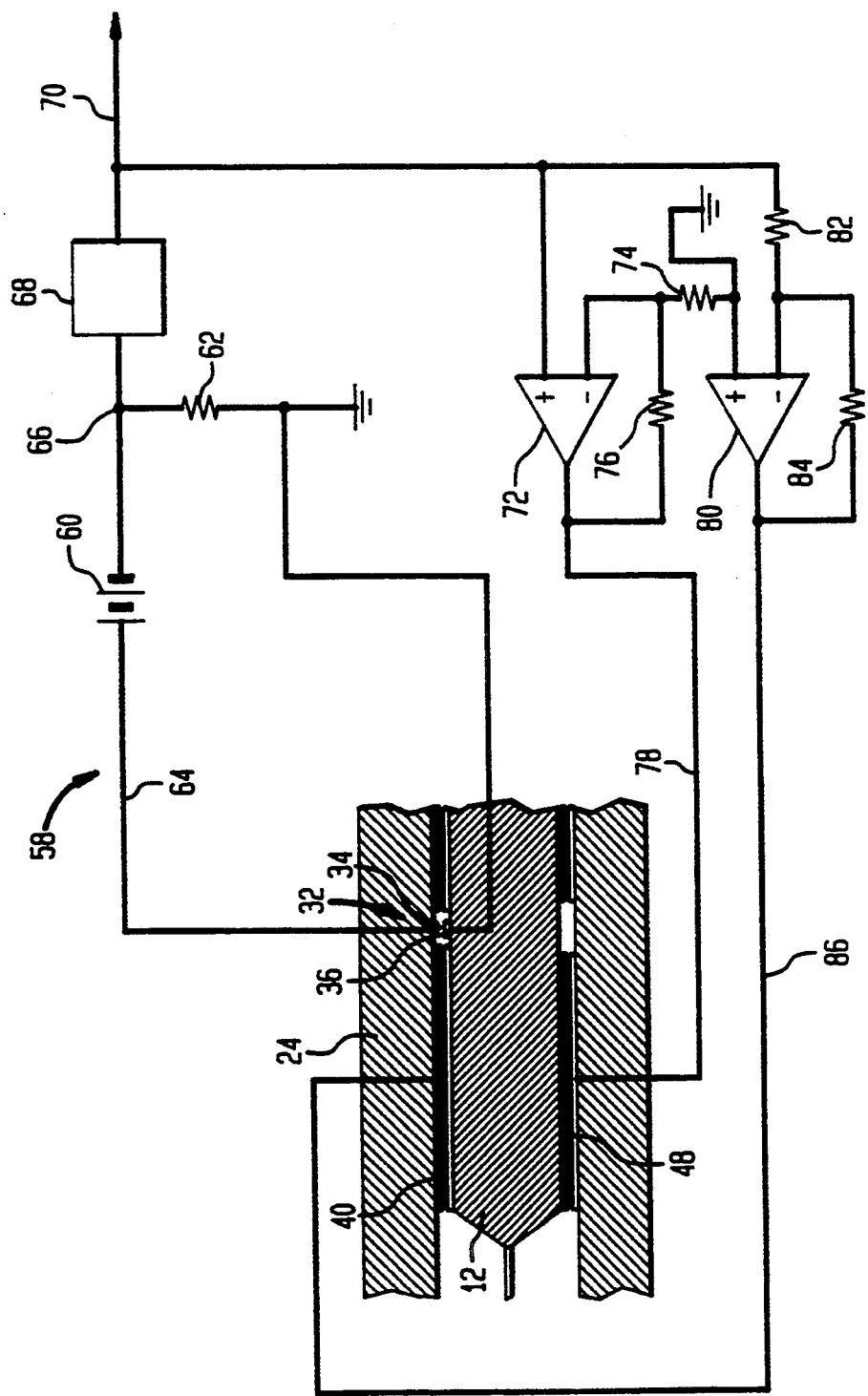
FIG. 2a is a simplified electrical block diagram of a tunnel position sensing and drive circuit used in the servo accelerometer of FIG. 1.

FIG. 2a shows a simplified electrical block diagram of the circuitry used in a servo loop for developing a signal indicative of acceleration of the proof mass and to provide drive signals to the electrostatic drive electrodes for maintaining the proof mass in its servo null position. A position sensing circuit 125 provides a voltage between lines 130 and 135 which is supplied to the sensing electrodes 85, 90 to generate a tunnel current. The tunnel current is used to generate a position sensing signal on line 140 which is indicative of the position of the proof mass 20 with respect to the frame 25. The position sensing signal on line 140 is supplied to the input of the drive circuit 145. The drive circuit 145 supplies drive voltages $V_{D1}$ and $V_{D2}$ to the drive electrodes to generate forces on the proof mass in the direction shown by arrows 150 and 155. Ideally, the forces denoted by arrows 150 and 155 are of equal magnitude when the proof mass is not subject to an acceleration input and the suspension is highly compliant.

Upon application of an acceleration along the sensitive axis of the accelerometer, the proof mass 20 is displaced from its servo null position. This displacement causes a change in the level of the tunnel current which, in turn, produces a corresponding change in the position sensing signal. The drive circuit 145 senses the deviation of the position sensing signal from its value when the proof mass is in its servo null position. When such a deviation is detected, the drive circuit alters the level of the drive voltages $V_{D1}$ and $V_{D2}$ to the drive electrodes so that the magnitude of the force produced by one drive electrode pair is increased while the force produced by the other drive electrode pair is decreased by an equal amount. This force differential drives the proof mass back to its servo null position. The drive circuit further utilizes the change in drive voltages to provide an output signal $V_{out}$ which is a function of the acceleration value.

The output signal $V_{out}$ can be made to be linearly related to the acceleration value since the acceleration value is a linear function of the drive voltages. When no acceleration is applied to the proof mass, there is a bias voltage A on each drive electrode pair which is greater than the voltage needed to drive the proof mass to its servo null position when it is subject to full scale acceleration. Thus, $V_{D1}=V_{D2}=A$ under these conditions. When the proof mass is subsequently moved from its servo null position due to application of an acceleration, the drive circuit alters the drive voltages by an amount X which counters the force on the proof mass due to the acceleration to drive the proof mass back to its servo null position. The drive voltage on one drive electrode pair will thus be A+X and on the other drive electrode pair A−X. The attractive force on one drive is thus reduced while the attractive force on the other drive is increased. The electrodes are planar and have a large surface area when compared to the separation between corresponding electrodes. The servo system permits very little motion of the proof mass 20 about undesired axes. As a result, the drive force on either side of the proof mass is very nearly proportional to the square of the voltage difference between the facing surfaces. Since the force on each drive is proportional to the square of the voltage on that drive, the force resulting from the acceleration can be calculated as follows (neglecting any proportionality constant):

$$\text{Force}=m \cdot a=(A+X)^2-(A-X)^2=4AX$$

where:
  m = mass of the proof mass
  a = acceleration on the proof mass that is to be measured Since A is constant and readily determined, it can be seen that the force is linearly related to the change in drive voltage X.

The servo accelerometer 15 shown in FIGS. 1 and 2 also provides a very compliant suspension along the hinge axis 40. This reduces the force applied by the flexures 30 and 35 to the proof mass and therefore decreases any signal bias caused by a difference between the servo null position and the mechanical null position of the proof mass 20. In a configuration in which the suspension offset results in elastic forces that create a significant bias offset, as the modulus of elasticity changes with temperature, the bias offset also changes thus making the bias on the output signal temperature sensitive. A compliant suspension tends to minimize such undesirable environmental effects on the servo accelerometer.

By way of nonlimiting example, the proof mass 12 may have an area of 5 square millimeters and thickness of 0.2 millimeters. The flexures 30 and 35 may have a thickness of 5 micrometers. The distance between the electrodes of an electrode pair may be 5 micrometers. The spacing between the first and second sensing electrodes 85 and 90 may be 0.5 nanometers.

FIGS. 3 through 11 illustrate various structures for providing compliant suspension of the proof mass 20. Accordingly, the details of the tunnel current position sensor, cover plates and drive electrodes described above have been omitted. It will be understood, however, that those components are located in the same place and operate in the same manner in the embodiments provided in the following description as in the embodiment described with respect to FIGS. 1–2A.

Figure 3:
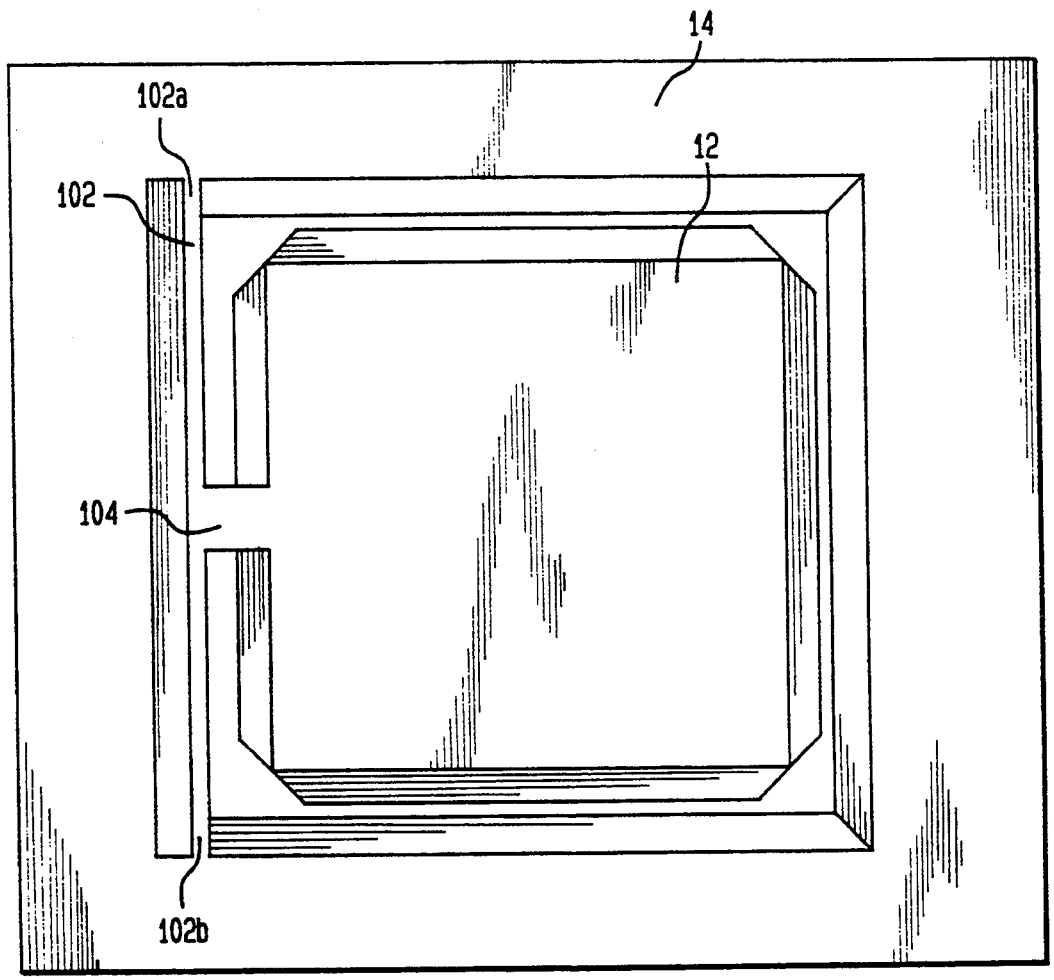
FIG. 3 is a plan view of a compliant torsional suspension structure in accordance with one embodiment of the present invention.
Figure 4:
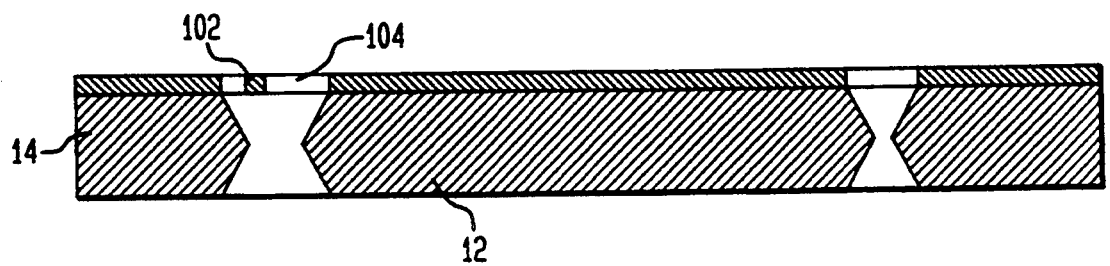
FIG. 4 is a cross sectional view of the compliant suspension structure shown in FIG. 3.

FIGS. 3 and 4 show a compliant torsion suspension for supporting the proof mass 20. The torsion suspension includes a transversely extending torsion member 160 which is joined with the support frame 25 at the regions 165 and 170. A longitudinally extending connecting member 175 joins the proof mass 20 with the torsion member 160. Torsion member 160 and connecting member 175 may be etched from an epitaxial layer 180.

Figure 5:
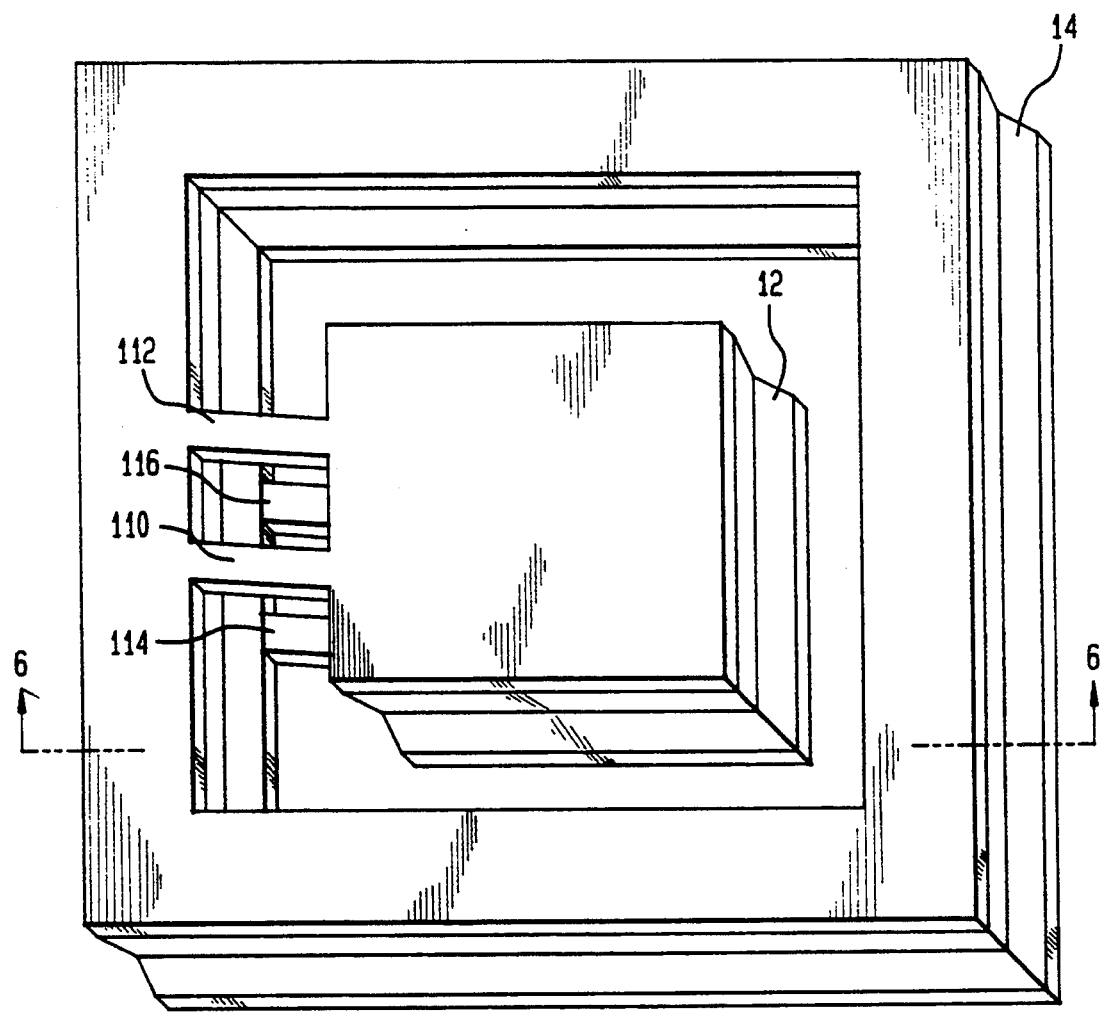
FIG. 5 is a perspective view of a compliant suspension structure with multiple flexures according to another embodiment of the present invention.
Figure 6:
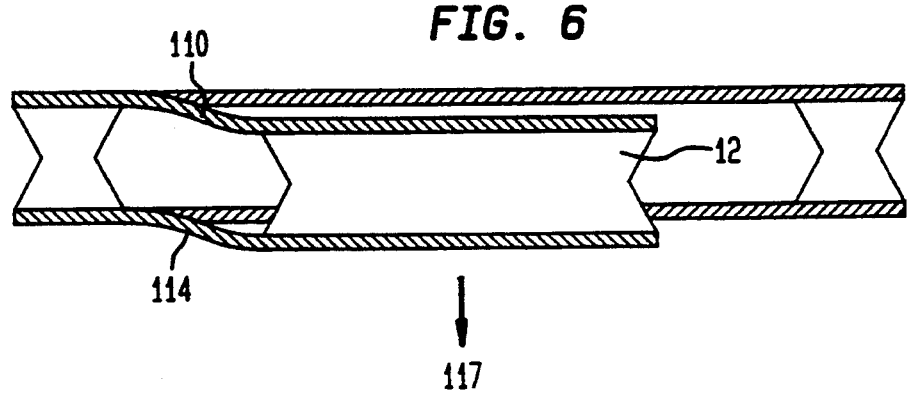
FIG. 6 is a cross-sectional view of the compliant suspension structure of FIG. 5 taken along line 6—6.

FIGS. 5 and 6 illustrates the use of flexures arranged in parallel to prevent undesired motion of the proof mass according to another embodiment of the present invention. As shown in FIG. 5, the proof mass 20 is coupled to the support frame 25 with multiple longitudinally extending flexures 185, 190, 195, 200. The flexures 185, 190 are parallel and generally spaced from each other in a plane defined by the upper face of the proof mass. Similarly, the flexures 195, 200 are parallel and generally spaced from each other in a plane defined by the lower face of the proof mass. In this way, a separation is provided between flexure pair 185, 190 and flexure pair 195, 200 in the direction of motion of the proof mass. This allows motion of the proof mass along the axis generally designated by arrow 117 of FIG. 6, while inhibiting undesired transverse motion of the proof mass. The structure shown in FIGS. 5 and 6 is also fabricated from a silicon wafer. The flexures 185, 190, 195, 200 are etched from epitaxially grown layers 205, 210 grown on the silicon wafer as will be understood by those skilled in the art. Layers 205 and 210 are doped differently from the substrate to facilitate selective etching by using a known electrochemical etch stop technique. An alternative method of obtaining the differently doped layers is to dope the substrate near its surfaces by diffusion.

This arrangement offers several advantages. The proof mass 20 is suspended to allow substantially only one degree of freedom, that is, linear motion in the direction of sensed acceleration. Parallel alignment of opposing drive electrodes is therefore maintained. In addition, vibration modes which are not controlled by the servo loop are reduced.

Figure 7:
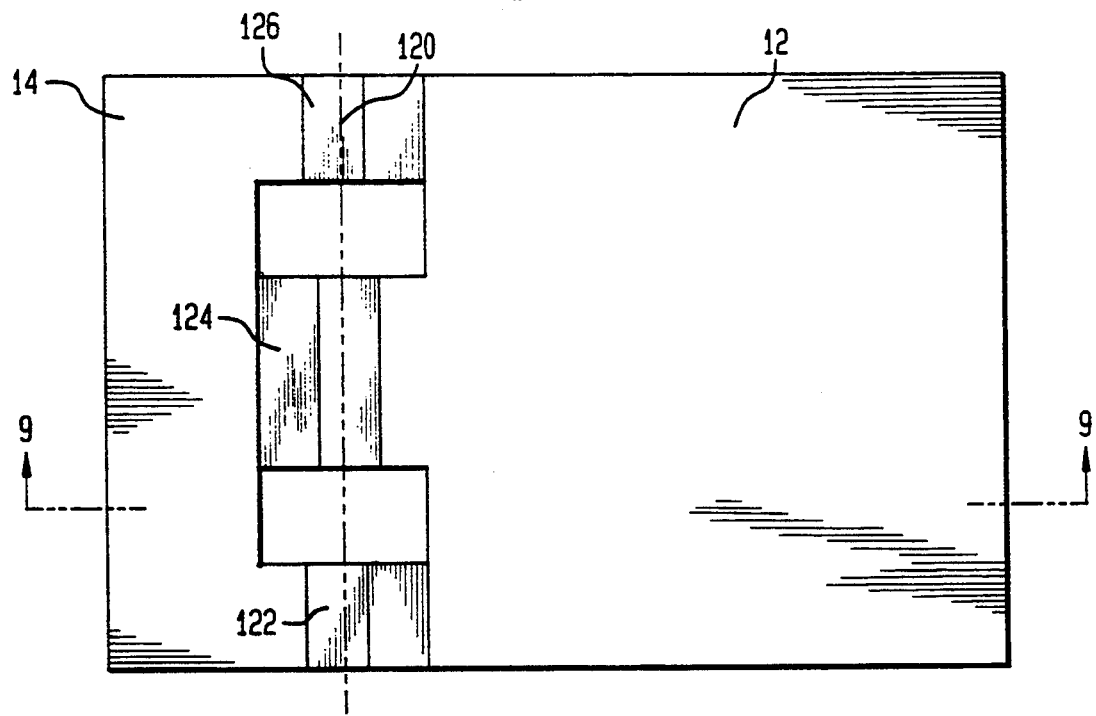
FIG. 7 is a plan view of a compliant suspension structure using cross-flexures in accordance with another embodiment of the present invention.
Figure 8:
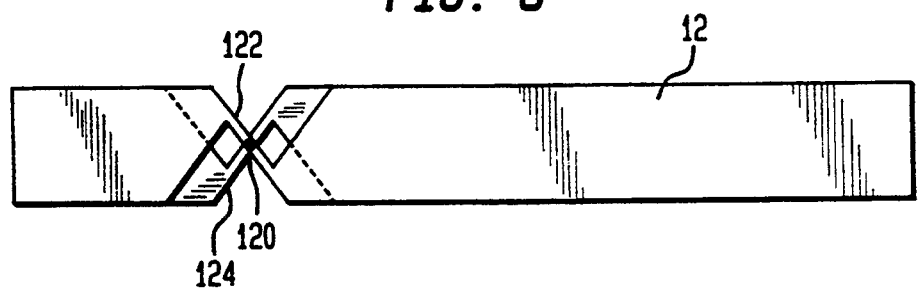
FIG. 8 is a side view of the compliant suspension structure shown in FIG. 7.
Figure 9:
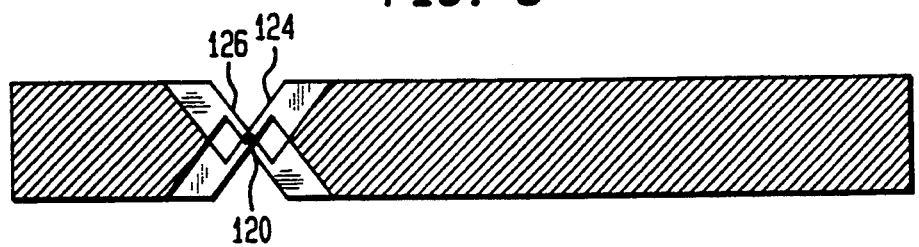
FIG. 9 is a cross-sectional view of the compliant suspension structure shown in FIG. 7 taken along line 9—9.

FIGS. 7-9 show a compliant flexure structure wherein the proof mass 20 is suspended with cross flexures in accordance with another embodiment of the present invention. Methods for creating cross flexures in a silicon wafer are further described in U.S. Pat. No. 4,919,993, the subject matter of which is hereby incorporated by reference. As best seen in FIG. 7, the proof mass 20 is constrained to movement about a hinge axis 215 with a plurality of cross flexures 220, 225, 230. The outer cross flexures 220 and 230 are substantially parallel having generally the same cross section. The inner cross flexure 225, as best seen in FIGS. 8-9, slopes in an opposite direction with respect to the outer flexures.

The cross flexures connect the proof mass 20 to the support frame 25 to permit rotation of the proof mass 20 relative to the support 25 about the hinge axis 215. This arrangement eliminates flexure S-bending and sag while providing a singular flexural pivot.

Figure 10:
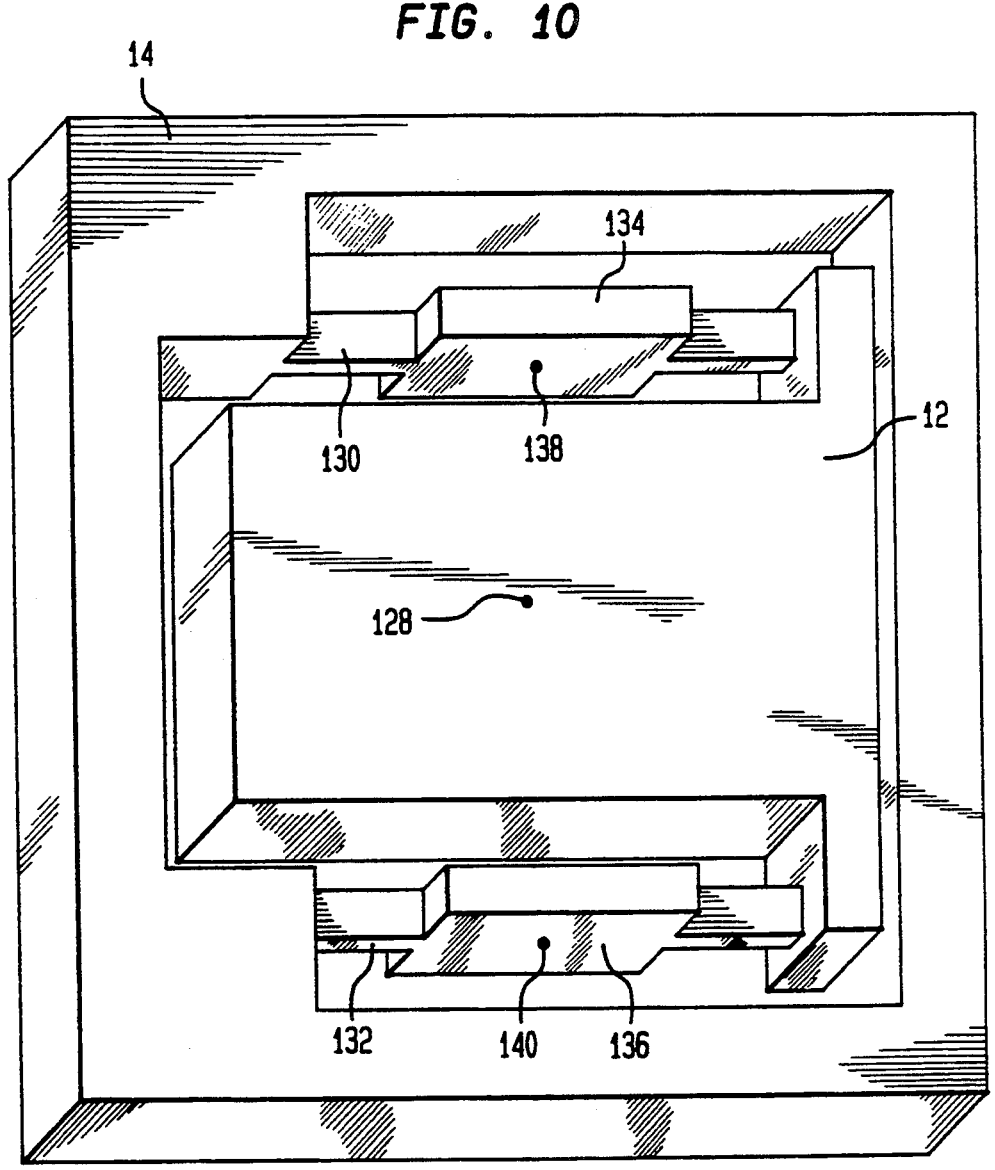
FIG. 10 is a perspective view of a compliant suspension structure having flexures with generally larger mid-portions in accordance with another embodiment of the present invention.

FIG. 10 illustrates a further compliant flexure structure wherein the proof mass 20 is suspended with long flexures shown generally at 235 and 240. A tradeoff, however, exists with the use of long flexures since greater compliance permits higher sensitivity to acceleration on the one hand and undesired rotation of the proof mass about its center of gravity, shown by a point 245, on the other. In addition, long flexures tend to fail by Euler buckling upon the receipt of longitudinal acceleration.

In FIG. 10, first and second longitudinally extending flexures 235 and 240 connect to mass extensions 245,250 to connect the proof mass 20 to the support 25. The flexures include mid-portions 255 and 260, respectively, having an increased thickness. The mid-portions substantially reduce first mode bending about the middle parts 265 and 270 of the flexures. However, bending in the S-mode becomes more prevalent and increases linearly toward the end portions of the flexures.

Figure 11:
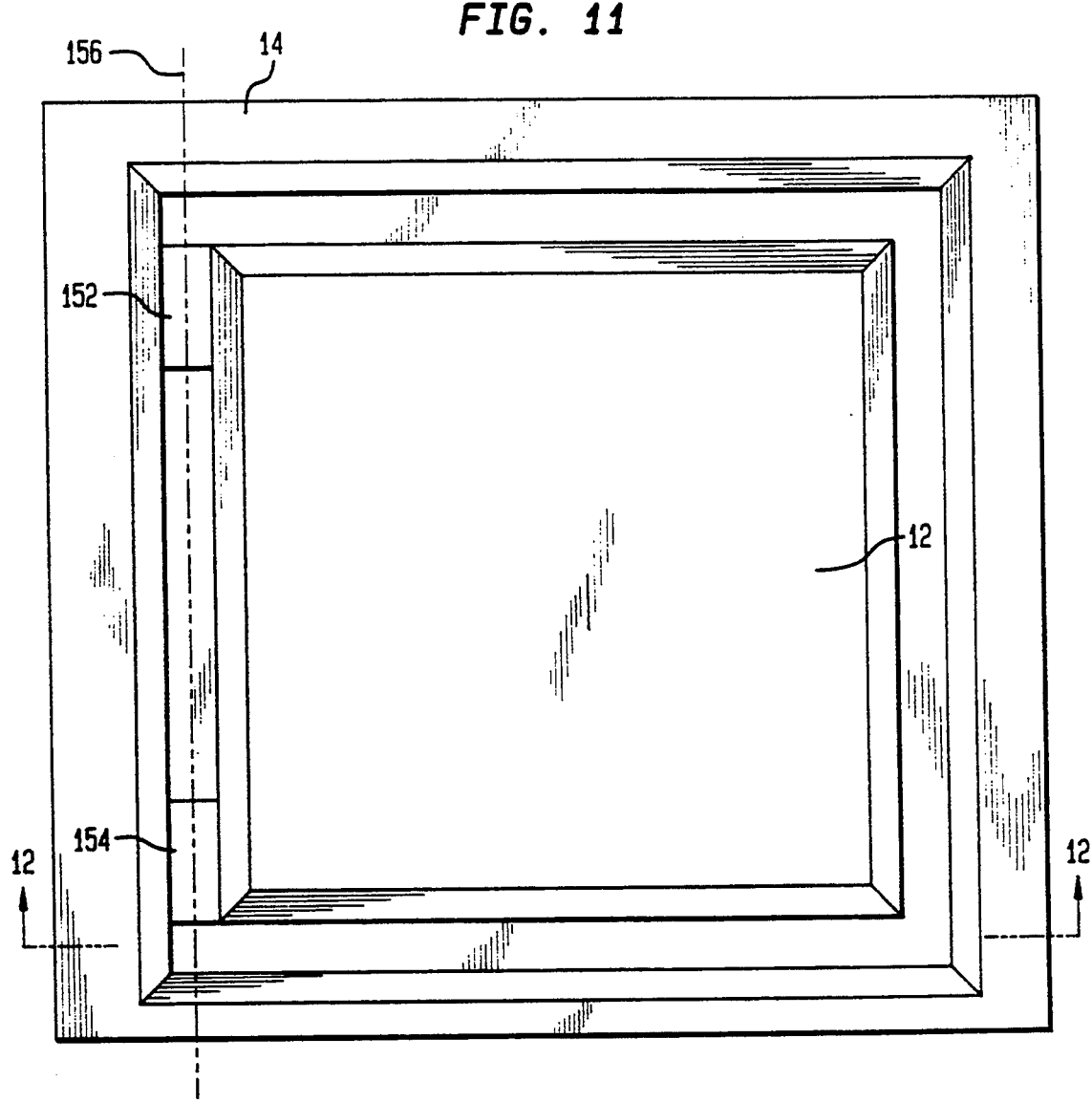
FIG. 11 is a plan view of a compliant suspension structure having a pair of flexures formed in one surface in accordance with another embodiment of the present invention.
Figure 12:
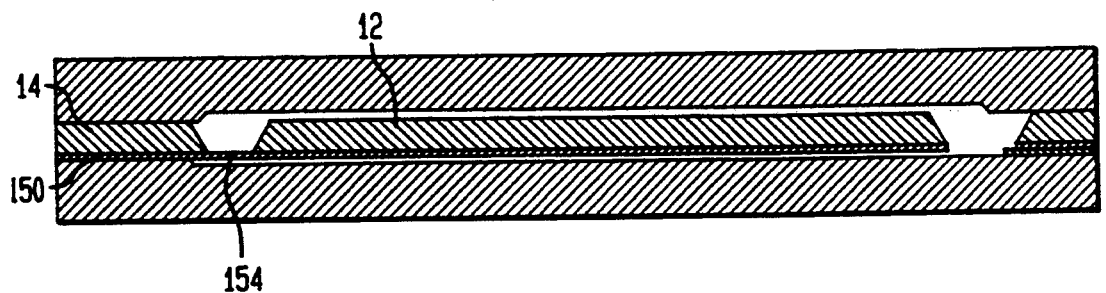
FIG. 12 is a cross-sectional view of the compliant suspension structure shown in FIG. 11.

FIGS. 11 and 12 show a compliant flexure system which is entirely formed on one surface layer 275. In a preferred embodiment of this particular flexure system, the layer 275 is an epitaxially grown silicon crystal layer having a doping differential from the substrate. The doping differential allows the layer to be protected with an electrochemical etch stop during bulk substrate etching.

As shown in FIGS. 11 and 12, the support frame 25 is coupled to the proof mass 20 with first and second longitudinally extending flexures 280, 285. The flexures 280, 285 provide a compliant suspension for the proof mass 20 and permit rotation about a transversely extending hinge axis 290 positioned midway between the proof mass 20 and support frame 25.

While several embodiments of the invention have been described hereinabove, those of ordinary skill in the art will recognize that the embodiments may be modified and altered without departing from the central spirit and scope of the invention. Thus, the preferred embodiments described hereinabove are to be considered in all respects as illustrative and not restrictive, the scope of the invention being indicated by the appended claims rather than by the foregoing description. Therefore, it is the intention of the inventors to embrace herein all changes which come within the meaning and range of equivalency of the claims.

What is claimed is:

1. An accelerometer comprising: position sensing means including a tunnel current sensor for sensing a displaced position of a proof mass from a servo null position and for generating a position sensing signal indicative of said displaced position;

means responsive to said position sensing signal for providing an output signal indicative of sensed acceleration;

electrostatic drive means for generating first and second electrostatic forces on said proof mass for returning said proof mass from said displaced position to said servo null position, said first electrostatic force being opposite in direction to said second electrostatic force;

a frame having first and second surfaces;

elastic connecting means for elastically connecting said proof mass to said frame;

a first cover plate sealingly engaging said first surface;

a second cover plate sealingly engaging said second surface opposite said first surface;

said first and second cover plates and said frame defining a chamber in which said proof mass is disposed; and a damping fluid disposed in said chamber.

2. An accelerometer as claimed in claim 1, wherein said electrostatic drive means comprises:

a first drive electrode in substantially fixed alignment with said frame;

a second drive electrode disposed on a first face of said proof mass and closely spaced from said first drive electrode;

a third drive electrode in substantially fixed alignment with said frame; and a fourth drive electrode disposed on a second face of said proof mass and closely spaced from said third drive electrode, said first face of said proof mass being opposite and substantially parallel to said second face of said proof mass.

3. An accelerometer as claimed in claim 2 wherein said first and second electrodes are planar and are spaced a first distance apart, and have a length and width substantially larger than the first distance, and wherein said third and fourth electrodes are planar and are spaced a second distance apart, and have a length and width substantially larger than the second distance.

4. An accelerometer as claimed in claim 3 wherein said electrostatic drive means further comprises a drive circuit which supplies a first drive voltage between said first and second drive electrodes and a second drive voltage between said third and fourth drive electrodes.

5. An accelerometer as claimed in claim 4 wherein said first and second drive voltages include a bias voltage component.

6. An accelerometer as claimed in claim 5 wherein said proof mass has a mechanical null position substantially coinciding with an electrical null position.

7. An accelerometer as claimed in claim 5 wherein said elastic connecting means is compliant along a desired direction.

8. An accelerometer as claimed in claim 5 wherein said drive circuit further provides an output signal indicative of sensed acceleration.

9. An accelerometer as claimed in claim 8 wherein said output signal has a component that is linearly related to said sensed acceleration.

10. An accelerometer as claimed in claim 9 wherein said output signal is derived from at least one of said drive voltages.

11. An accelerometer as claimed in claim 2 wherein said elastic connecting means comprises at least one flexure extending between said frame and said proof mass, said flexure permitting rotation of said proof mass about a hinge axis.

12. An accelerometer as claimed in claim 1 wherein said elastic connecting means comprises:
   a torsion member connected between opposite sides of said frame; and
   a connecting member connected between said torsion member and said proof mass.

13. An accelerometer as claimed in claim 1 wherein said elastic connecting means comprises:
   a plurality of parallel flexures extending between said frame and said proof mass and being generally spaced from one another in a plane generally defined by a first face of said proof mass; and
   a further plurality of parallel flexures extending between said frame and said proof mass and being generally spaced from one another in a plane generally defined by a second face of said proof mass.

14. An accelerometer as claimed in claim 1 wherein said elastic connecting means comprises a plurality of cross flexures extending between said frame and said proof mass.

15. An accelerometer as claimed in claim 1 wherein said elastic connecting means comprises a plurality of flexures extending along the length of said proof mass, said plurality of flexures adapted for S-mode bending and having a mid-portion with a thickness greater than its respective end portions.

16. An accelerometer as claimed in claim 1 wherein said frame and said proof mass have a common surface layer, said elastic connecting means comprising at least one flexure formed from said common surface layer.

17. An accelerometer as claimed in claim 16 wherein said common surface layer is comprised of a silicon crystal layer having a doping differential from the substrate forming said frame and said proof mass.

18. An accelerometer comprising:
   proof mass;
   a frame having first and second surfaces;
   elastic connecting means for elastically connecting said proof mass to said frame;
   a tunnel current sensor disposed to generate a tunnel current, the magnitude of said tunnel current being indicative of the relative position of said frame and said proof mass;
   a position sensing circuit connected to supply a voltage potential to said tunnel current sensor and for generating a position sensing signal from said tunnel current, said position sensing signal corresponding to a displaced position of said proof mass from a servo null position with respect to said frame;
   a drive circuit for generating drive voltages in response to said position sensing signal and for generating an output signal indicative of sensed acceleration;
   a plurality of drive electrodes disposed to provide oppositely directed electrostatic forces on said proof mass to urge said proof mass from said displaced position to said servo null position in response to said drive voltages;
   a first cover plate sealingly engaging said first surface of said frame;
   a second cover plate sealingly engaging said second surface opposite said first surface of said frame;
   said first and second cover plates and said frame defining a chamber in which said proof mass is disposed; and
   a damping fluid disposed in said chamber.

19. An accelerometer as claimed in claim 18 wherein said drive voltages include a bias voltage component.

20. An accelerometer as claimed in claim 19 wherein a mechanical null position of said proof mass and said servo null position of said proof mass substantially coincide.

21. An accelerometer as claimed in claim 19 wherein said elastic connecting means is compliant along a desired sensitive direction.

22. An accelerometer as claimed in claim 20 wherein said elastic connecting means is compliant along a desired sensitive direction.

23. An accelerometer as claimed in claim 20 wherein said elastic connecting means comprises at least one flexure extending between said frame and said proof mass, said flexure permitting rotation of said proof mass about a transversely extending hinge axis.

24. An accelerometer as claimed in claim 20 wherein said elastic connecting means comprises:
   a torsion member connected between opposite sides of said frame; and
   a connecting member connected between said torsion member and said proof mass.

25. An accelerometer as claimed in claim 20 wherein said elastic connecting means comprises:
   a plurality of parallel flexures extending between said frame and said proof mass and being generally spaced from one another in a plane generally defined by a first face of said proof mass; and
   a further plurality of parallel flexures extending between said frame and said proof mass and being generally spaced from one another in a plane generally defined by a second face of said proof mass.

26. An accelerometer as claimed in claim 20 wherein said elastic connecting means comprises a plurality of cross flexures extending between said frame and said proof mass.

27. An accelerometer as claimed in claim 20 wherein said elastic connecting means comprises a plurality of flexures extending along said proof mass, each flexure of said plurality of flexures being adapted for S-mode bending and having a mid-portion with a thickness greater than the respective end portions said flexure.

28. An accelerometer as claimed in claim 20 wherein said frame and said proof mass have a common surface layer, said elastic connecting means comprising at least one flexure formed from said common surface layer.

29. An accelerometer as claimed in claim 28 wherein said common surface layer is comprised of a silicon crystal layer having a doping differential from the substrate forming said frame and said proof mass.

30. An accelerometer as claimed in claim 21 wherein said elastic connecting means comprises at least one flexure extending between said frame and said proof mass, said flexure permitting rotation of said proof mass about a transversely extending hinge axis.

31. An accelerometer as claimed in claim 21 wherein said elastic connecting means comprises:
a torsion member connected between opposite sides of said frame; and
a connecting member connected between said torsion member and said proof mass.

32. An accelerometer as claimed in claim 22 wherein said elastic connecting means comprises:
a plurality of parallel flexures extending between said frame and said proof mass and being generally spaced from one another in a plane generally defined by a first face of said proof mass; and
a further plurality of parallel flexures extending between said frame and said proof mass and being generally spaced from one another in a plane generally defined by a second face of said proof mass.

33. An accelerometer as claimed in claim 21 wherein said elastic connecting means comprises a plurality of cross flexures extending between said frame and said proof mass.

34. An accelerometer as claimed in claim 21 wherein said elastic connecting means comprises a plurality of flexures extending along said proof mass, each flexure of said plurality of flexures being adapted for S-mode bending and having a mid-portion with a thickness greater than the respective end portions said flexure.

35. An accelerometer as claimed in claim 21 wherein said frame and said proof mass have a common surface layer, said elastic connecting means comprising at least one flexure formed from said common surface layer.

36. An accelerometer as claimed in claim 35 wherein said common surface layer is comprised of a silicon crystal layer having a doping differential from the substrate forming said frame and said proof mass.

37. An accelerometer as claimed in claim 22 wherein said elastic connecting means comprises a flexure extending between said frame and said proof mass, said flexure permitting rotation of said proof mass about a transversely extending hinge axis.

38. An accelerometer as claimed in claim 22 wherein said elastic connecting means comprises:
a torsion member connected between opposite sides of said frame; and
a connecting member connected between said torsion member and said proof mass.

39. An accelerometer as claimed in claim 22 wherein said elastic connecting means comprises:
a plurality of parallel flexures extending between said frame and said proof mass and being generally spaced from one another in a plane generally defined by a first face of said proof mass; and
a further plurality of parallel flexures extending between said frame and said proof mass and being generally spaced from one another in a plane generally defined by a second face of said proof mass.

40. An accelerometer as claimed in claim 22 wherein said elastic connecting means comprises a plurality of cross flexures extending between said frame and said proof mass.

41. An accelerometer as claimed in claim 22 wherein said elastic connecting means comprises a plurality of flexures extending along said proof mass, each flexure of said plurality of flexures being adapted for S-mode bending and having a mid-portion with a thickness greater than the respective end portions said flexure.

42. An accelerometer as claimed in claim 22 wherein said frame and said proof mass have a common surface layer, said elastic connecting means comprising at least one flexure formed from said common surface layer.

43. An accelerometer as claimed in claim 42 wherein said common surface layer is comprised of a silicon crystal layer having a doping differential from the substrate forming said frame and said proof mass.

44. An accelerometer as claimed in claim 18 wherein said tunnel current sensor comprises:
a first tunnel current electrode disposed in substantially fixed alignment with said frame; and
a second tunnel current sensor electrode disposed on said proof mass in close relationship with said first tunnel current electrode.

45. An accelerometer as claimed in claim 18 wherein said plurality of drive electrodes comprises:
a first electrode disposed on a first face portion of said proof mass;
a second electrode disposed on said first cover plate and closely spaced from a first conducting surface, said first and second electrodes being connected to receive one of said drive voltages;
a third electrode disposed on a second face portion of said proof mass, said second face portion being in a plane substantially parallel to said first face portion; and
a fourth electrode disposed on said second cover plate and closely spaced from said third electrode, said third and fourth electrodes being connected to receive an other of said drive voltages.

* * * * *